(12) United States Patent
Deakin

(10) Patent No.: US 10,926,619 B2
(45) Date of Patent: Feb. 23, 2021

(54) ENERGY STORAGE AND RECOVERY SYSTEM

(71) Applicant: Punch Flybrid Limited, Northampton (GB)

(72) Inventor: Andrew Deakin, Ardley (GB)

(73) Assignee: Punch Flybrid Limited, Northampton (GB)

( * ) Notice: Subject to any disclaimer, the term of this patent is extended or adjusted under 35 U.S.C. 154(b) by 0 days.

(21) Appl. No.: 16/482,228

(22) PCT Filed: Jan. 31, 2018

(86) PCT No.: PCT/GB2018/050288
§ 371 (c)(1),
(2) Date: Jul. 30, 2019

(87) PCT Pub. No.: WO2018/142135
PCT Pub. Date: Aug. 9, 2018

(65) Prior Publication Data
US 2020/0047599 A1    Feb. 13, 2020

(30) Foreign Application Priority Data

Jan. 31, 2017 (GB) ...................... 1701610

(51) Int. Cl.
*B60K 6/10* (2006.01)
*B60L 50/30* (2019.01)
(Continued)

(52) U.S. Cl.
CPC ............... *B60K 6/105* (2013.01); *B60K 6/30* (2013.01); *B60K 6/365* (2013.01); *B60K 25/02* (2013.01); *B60L 50/30* (2019.02)

(58) Field of Classification Search
CPC ... F16H 57/0423; F16H 57/037; B60K 6/105; B60K 6/30; B60K 25/02; B60L 50/30
See application file for complete search history.

(56) References Cited

U.S. PATENT DOCUMENTS

| 4,471,668 A * | 9/1984 | Elsner ................. B60K 6/105 |
| | | 180/165 |
| 8,708,081 B1 | 4/2014 | Williams |
| (Continued) | | |

FOREIGN PATENT DOCUMENTS

| DE | 3842631 | 6/1990 |
| DE | 3912369 | 10/1990 |
| (Continued) | | |

*Primary Examiner* — Vicky A Johnson
(74) *Attorney, Agent, or Firm* — Stetina Brunda Garred and Brucker

(57) ABSTRACT

The invention relates to an energy storage and recovery system (ERS) coupleable to a prime mover and to an energy storage flywheel. The ERS has a hydrostatic arrangement with a first pumping element and a second pumping element. The pumping elements have a respective fluid displacement and a fluid coupling arrangement for the transfer of fluid power between the first and second pumping elements. The ERS also includes a differential device comprising at least three inputs, wherein a first driveshaft of the first pumping element is coupled to a prime mover in use, a first input of the a differential device is coupled to said prime mover in use, a second input of the differential device is coupled to a second driveshaft of the second pumping element, and the third input of the differential device is coupled to a flywheel in use.

27 Claims, 4 Drawing Sheets

(51) Int. Cl.
  *B60K 6/30*    (2007.10)
  *B60K 6/365*   (2007.10)
  *B60K 25/02*   (2006.01)

(56) References Cited

U.S. PATENT DOCUMENTS

2004/0226766 A1*  11/2004  Cook ................... B60K 17/344
                                                        180/233
2007/0049443 A1    3/2007  Schmidt
2015/0128738 A1*  5/2015   Ono .................... F16H 57/0494
                                                        74/339

FOREIGN PATENT DOCUMENTS

| DE | 10200703357  | 1/2009  |
| WO | WO8200270    | 2/1982  |
| WO | WO2010082079 | 7/2010  |
| WO | WO2013174825 | 11/2013 |
| WO | WO2015019789 | 2/2015  |

* cited by examiner

ENERGY STORAGE AND RECOVERY SYSTEM

CROSS-REFERENCE TO RELATED APPLICATIONS

The present application claims priority to PCT International Application No. PCT/GB2018/050288 filed on Jan. 31, 2018, which claims priority to GB 1701610.6 filed Jan. 31, 2017, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to an energy recovery system (ERS) and in particular, to a KERS in which energy is stored as rotational kinetic energy in a flywheel. The invention has particular, but not exclusive, application to construction, industrial, agricultural and other off-highway vehicles, but also has application of other vehicles and machines. The abbreviation "ERS" will be used to refer to an energy recovery system.

BACKGROUND OF THE INVENTION

It is known to attach an ERS to a part of vehicle drivetrain. An ERS comprises typically a flywheel system and an energy transfer transmission for transmitting power to and from a power sink/source, this sink/source typically being the wheels of the vehicle. However, this invention is concerned with utilising energy from one or multiple sources within a vehicle or machine, storing this energy, and then re-using the energy for one or more purposes. The significance of the sink/source is that power flow transmitted to or from the flywheel may be in either direction. In the case of the source/sink being a rotary device such as the wheels of a vehicle or an internal combustion engine, the energy transfer transmission is required to accommodate a continuously varying speed ratio between the flywheel and the power source/sink as the speed of at least the flywheel and potentially both the flywheel and the power source/sink varies continuously as power is exchanged between the two. In this example, power flow to the flywheel causes the flywheel to accelerate thus increasing its speed whilst (in this case) the sink/source acts as a source and is decelerated. Thus, power flow to the flywheel causes the source/sink to decelerate; examples of this event include vehicle regenerative braking. Conversely, power flow from the flywheel causes the flywheel to decelerate thus decreasing its speed whilst, in this case, the sink/source acts as a sink and is accelerated; accordingly, power flow from the flywheel causes the source/sink to accelerate; examples of this event include vehicle acceleration using flywheel energy to do so. In this example, the energy being recovered is kinetic energy of the vehicle.

Another example of a source/sink is the boom and/or slew of a construction machine such as an excavator, in which case the energy may take the form of a volume of fluid being transferred at a given pressure into or out of a hydraulic service (fluid energy is defined as the product of fluid volume and pressure).

Another example of a source/sink is an engine or motor, such as an internal combustion engine, in which case the energy may take the form of a rotational angle of a shaft at a given torque (such rotational energy is defined as the product of rotational angle and torque).

There are two principal elements of an ERS: the energy storage device, and the energy transfer transmission. The energy storage device principally considered in this invention is a rotary mechanical storage device, or a flywheel. Typically this will be a high speed flywheel which is adapted to run up to a maximum speed of 20,000 rpm or more. A high speed flywheel enables high levels of energy to be stored in the flywheel. The energy transmission has requirements that it should have a continuously variable ratio, and preferably also has a high efficiency and a suitable ratio spread. Challenges can exist in achieving acceptable transmission characteristics in a low cost, reliable, compact, and proven solution. In vehicle applications in particular, achieving a solution which offers packaging flexibility can be a great advantage when the device is to be fitted to a range of different vehicle types and sizes.

In most vehicles or machines, there is also a prime mover such as an internal combustion engine or an electric motor. In certain applications where cyclic, frequently repeated, operations are required to be carried out, the engine can be operating at certain points in the repeated cycle, but very low power (or even engine braking) at other points in the cycle. The mean power of the engine may in fact be only a portion of the maximum power required.

SUMMARY OF THE INVENTION

An aim of this invention is to improve the efficiency of an energy transfer transmission in an ERS for a vehicle or a machine such as a construction, industrial, agricultural or other off-highway vehicle or machine. A further aim of this invention is to provide an ERS which can enable an efficient and/or a reduced size prime mover in a vehicle or a machine such as a construction, industrial, agricultural or other off-highway vehicle or machine. A further aim of this invention is to provide a plurality of modes of ERS operation in a vehicle or a machine such as a construction, industrial, agricultural or other off-highway vehicle or machine, with the aim of reducing system cost and/or fuel consumption and/or exhaust emissions. A further aim of this invention is to provide a low technical risk, low cost and compact ERS for use in a vehicle or a machine such as a construction, industrial, agricultural or other off-highway vehicle or machine.

Therefore according to the present invention, there is provided an energy storage and recovery system (ERS) coupleable to a prime mover and to an energy storage flywheel, the ERS comprising:

a hydrostatic arrangement having a first pumping element and a second pumping element, each pumping element having a respective fluid displacement and a fluid coupling arrangement for the transfer of fluid power between the first and second pumping elements; and a differential device comprising at least three inputs, wherein a first driveshaft of the first pumping element is coupled to a prime mover in use, a first input of the a differential device is coupled to said prime mover in use, a second input of the differential device is coupled to a second driveshaft of the second pumping element, and the third input of the differential device is coupled to a flywheel in use.

Typically this invention may have application to a construction, agricultural or industrial machine. Such a machine or vehicle will typically have a requirement for on-board or in-vehicle hydraulic service, such as a boom, cab rotation or slew or other hydraulically actuated service or implement. A hydraulic pump is often driven by the prime mover such as an internal combustion engine, the fluid being fed at pressure from such engine-mounted pump to the hydraulic services. This invention makes use of this conventional pump arrangement, augmenting it with the differential device and second pumping element in order to open up possibilities of energy recuperation and reuse in the vehicle or machine. This may increase efficiency of the vehicle.

The ERS differential device may be an epicyclic gearset. Such a gearset may typically comprise a sun gear, carrier and an annulus gear, although there are many variations of epicyclic that are known. In a simple epicyclic just described, there is a negative speed ratio between the sun and annulus when the carrier is held still; this ratio characterises the epicyclic configuration and shall be termed R13_epi. The carrier may typically comprise a ring of planet gears which are free to rotate about their own respective axis, but which also orbit the sun gear. Other forms of epicyclic may be employed, as required, such variants including bevel gear epicyclics as are found in the final drive of a vehicle, idler epicyclics in which pairs of mutually engaged planets engage with the sun and annulus.

At least one of the pumping elements may have a mechanism for varying its fluid displacement.

At least one of the pumping elements may have a mechanism for varying and reversing flow (for a given sense of speed of its driveshaft).

The first and second pumping elements may have a mechanism for varying their respective fluid displacement.

Both first and second pumping elements may have a mechanism for varying and reversing flow (for a given sense of speed of the respective driveshafts).

The first and the second pumping elements may be coupled via their respective fluid coupling arrangements for the transmission of fluid power between the two.

Coupling the first and second pumping elements via their fluid coupling arrangements creates a hydrostatic CVT, as is known. The ratio of the fluid displacement settings of the pumps substantially defines the speed ratio, and therefore also the torque ratio, of the hydrostatic CVT.

The ERS may comprise a power-split arrangement in which only a portion of the power passing between the engine and flywheel passes between the first and second pumping arrangements.

Since the efficiency of hydrostatic CVTs, especially low cost hydrostatic CVTs, is lower than that of many other types of CVT, it is beneficial to increase the efficiency of the overall ERS drive arrangement so that power to and from the engine and/or flywheel can be improved. Thus, in the ERS of this invention a power-split arrangement is proposed.

The power-split arrangement is so termed because it includes a variable ratio path (i.e. a power transmission path whose ratio is continuously variable) such as a CVT and a fixed ratio path, the latter typically being of higher efficiency than the former. The power paths are arranged to be in parallel with one another. This layout is termed a 'shunt'. In one form of shunt, the speeds from the variable and fixed ratio paths are summed at one end (i.e. at an input end or an output end) in the differential speed device, and the torques are summed at the other end (i.e. the other of the input and output end) at a node termed the 'coupling point', or 'torque summing junction'. If the coupling point is located on the output side of the shunt, then it is referred to as output-coupled. Similarly, if the coupling point is located on the input side of the epicyclic, then this is referred to as input-coupled.

Since only a portion of the total power passes through the less efficient variable ratio path in a power-split shunt, the overall efficiency of the device is increased compared with an arrangement which included only a variable ratio path. This may be illustrated from the simplified expression which adds estimated losses of each path together to form a combined efficiency of the KERS transmission:

$$\text{KERS transmission efficiency} \approx P_{CVT} \times (1-E_{CVT}) + (1-P_{CVT}) \times (1-E_{RFP})$$

$P_{CVT}$=Proportion of total power passing through the variable ratio path (CVT)
$E_{CVT}$=Efficiency of CVT
$E_{FRP}$=Efficiency of fixed ratio path If 25% of the total power passes through the CVT at a particular operating point, and the fixed ratio path has an efficiency of 96% and the CVT path has an efficiency of 84%, then the KERS efficiency may be estimated to be:

$$\text{KERS transmission efficiency} \approx 1-\{[0.25\times(1-0.84)]+[(1-0.25)\times(1-0.96)]\}=93\%$$

This is significantly higher than the 84% of the CVT path alone. The above estimate excludes efficiency effects from other drive ratios such as the final drive, but is sufficient for illustrative purposes.

The power-split arrangement may comprise a differential or speed-mixing device with at least three inputs. The differential or speed-mixing arrangement preferably has exactly three inputs. Typically, the differential or speed-mixing arrangement comprises an epicyclic gearset. The three inputs in this gearset may be a sun, carrier and an annulus, but other forms of epicyclic such as a bevel gear type (as is found in final drive transmissions), or an idler epicyclic (in which pairs of planets in mutual engagement with one another, and mounted within the carrier, mesh with the sun and annulus) are also known. The epicyclic may suitably comprise a simple sun, carrier and annulus, or may alternatively comprise two sun gears and a carrier comprising bevel gears; in another example the epicyclic comprises a sun gear, an idler planet carrier arrangement and annulus.

The hydrostatic CVT may comprise two pumping elements (these may each be configured as either a hydraulic pump and/or a motor), and may have a ratio that is varied by adjusting the fluid displacement of one or both units. Such adjustment may be made by adjusting a swash plate angle in an axial piston pump, or it may be made by adjusting the angle of a bent-axis piston pump arrangement, as required. Relative displacement settings of the pumping elements sets the speed ratio (and torque ratio) of the hydrostatic CVT. One or both of the pumping units may be able to set to a substantially zero fluid displacement.

The hydrostatic CVT may comprise two pumping units (these may each be configured as either a hydraulic pump and/or a motor), and may have a ratio that is varied by adjusting the fluid displacement of one or both units. Such adjustment may be made by adjusting a swash plate angle in an axial piston pump, or it may be made by adjusting the angle of a bent-axis piston pump arrangement, as required. Relative displacement settings of the pumping elements sets the speed ratio (and torque ratio) of the hydrostatic CVT. One or both of the pumping units may be able to set to a substantially zero displacement.

Returning to the output coupled shunt arrangement, if the displacement of the pumping unit on the CVT input side is set substantially to zero then the KERS may be engaged (i.e. the flywheel is connected via an engaged KERS to the wheels) even when the vehicle is stationary. The hydrostatic CVT ratio is effectively locked so that its output, which is connected to the KERS output, has a zero speed. Thus torque can be applied by the KERS to the vehicle wheels even when the vehicle is near a stationary condition, thus maximising energy transfer possibilities. Further, there is no need to include a disconnect, clutch or launch device between the KERS and the wheels of the vehicle, thus saving on weight, cost and complexity. It should be noted that in order to achieve this 'engaged KERS neutral' function with the input coupled arrangement, the epicyclic unit would need to mix non-zero speeds from the flywheel and from the output of the hydrostatic CVT in order to provide a zero output speed condition on its third element, thus providing the zero speed condition at the vehicle wheels. When torque is applied to the wheels with such an input-coupled arrangement, power recirculation must occur within the KERS transmission, and this can result in an undesirably high level of power loss. The output coupled shunt is therefore preferable as it is offers greater efficiency under the launch condition. Being able to accommodate frequent vehicle stops and launches. This is important in urban cycle vehicles such as city cars, refuse trucks, delivery trucks, and especially in buses. As the ratio shifts away from the stationary vehicle ('KERS engaged neutral') condition, all power passes through the CVT, which as mentioned previously may be relatively inefficient; however, this power level is relatively low since vehicle speed is close to zero, and drag losses will be low because there is no fluid circulating within the hydrostatic CVT. This output coupled power-split shunt is a preferable arrangement to the recirculating power condition of the input coupled shunt, where much energy would be lost when the vehicle is stationary, such as a bus waiting in a depot or at a bus stop.

Further advantages of this arrangement will now be described.

In a hydrostatic CVT arrangement the speed and torque senses can be arranged such that power flows in the same sense (i.e. from engine towards the flywheel, or vice versa) through the fixed and variable ratio paths across most or all of the ERS operating envelope. This is preferable to an arrangement in which there is recirculating power (i.e. in one of the parallel paths power is flowing in an opposite sense to the power in the other path), where more energy would be lost. The preferable pure power-split configuration may be achieved using the simple epicyclic described earlier, wherein preferably the sun gear is coupleable to the flywheel, the carrier is coupleable to the engine and a first pumping element, the annulus is coupleable to a second pumping element and is configured to generally rotate in the opposite direction to the carrier. This may be readily achieved by suitably arranging the first and second pumping elements, and their respective fluid displacement mechanisms, and is indeed one of the advantages of using a flexible hydrostatic CVT arrangement. With a mechanical CVT, suitable gearing would be required and this would bring other mechanical constraints which may comprise weight and package.

Further, when the first pumping element (driven by the engine side) of the hydrostatic CVT is able to adopt a substantially zero displacement condition the driveshaft of the second pumping element is constrained to have a substantially zero speed. In this condition, the KERS transmission may be at an overdrive ratio (that is, high engine speed relative to flywheel speed) but none of the total power passing through the transmission passes through the CVT. Thus, this condition offers a very efficient, and the high powers associated with energy recovery from high vehicle speeds can be recovered very efficiently as all power passes through the mechanical drive path of the KERS transmission.

Accordingly, one or both of the first and second pumping elements may be able to adopt a fluid displacement setting which is substantially zero.

The first pumping element preferably includes a drive shaft. The second pumping element preferably also includes a drive shaft. In a preferred configuration, the first pumping element drive shaft is coupled to an epicyclic carrier, the second pumping element drive shafts is coupled to an annulus and the flywheel is coupled to an epicyclic sun. Optionally the epicyclic is a simple epicyclic, in which there is a negative speed ratio between the sun and annulus (with the carrier held stationary).

The respective fluid coupling arrangements of the first and the second pumping elements may be de-coupled so that transmission of fluid power between the two is not possible.

At least one of the respective fluid coupling arrangements of the first and the second pumping elements may be selectively coupled to one or more hydraulic services for the transmission of fluid power between the two. For example, the first pumping element which is coupled to the engine can be used to provide to, and/or to recuperate energy from, one or more hydraulic service such as a boom, loading arm, cab slew or similar hydraulically powered implement. In this way, when the flywheel is not required or is not charged, the engine may supply power to, or be supported by power from, such hydraulic services. Alternatively, or additionally, fuel may be saved by only using the second pump to supply power to, or to recuperate power from, at least one hydraulic service. In this way, when the flywheel is partially or fully charged, previously captured energy stored in the flywheel may be used to power one or more hydraulic service thereby saving fuel or energy used to power the prime mover such as the internal combustion engine.

The ERS may be further adapted for transfer of vehicle kinetic energy between the wheels and the flywheel.

Advantageously, this may by itself, or in addition to recuperation of hydraulic energy, offer further energy and fuel savings for the vehicle or machine.

Aside from re-using energy from hydraulic or vehicle/machine services, the ERS may also enable down-sizing of the prime mover, thus saving energy (small engines or motors tend to be more efficient since they run closer to full load), cost and weight. Further, there may be some advantages in using one design of prime mover across a wider range of products, thus offering a commercial advantage to the manufacturer.

The present invention also provides a method of controlling a machine or vehicle comprising an ERS such as that described above, the method comprising the following steps:

a. Determining a signal indicative of a power demanded by the current operating conditions of the machine or vehicle duty cycle;

b. Setting the prime mover power output to exceed that demanded by the current operating conditions of the vehicle or machine duty cycle; and c. Varying the fluid displacement setting on one or both of the first and second pumping elements in order to effect power transfer from the prime mover to the flywheel.

The present invention may further provide a method of controlling a machine or vehicle comprising an ERS such as that described above, the method comprising the following steps:

a. Determining a signal indicative of a power demanded by the current operating conditions of the machine or vehicle duty cycle;

b. Setting the prime mover power output to a level which is lower than that demanded by the current operating conditions of the vehicle or machine duty cycle; and c. Varying the fluid displacement setting on one or both of the first and second pumping elements in order to effect power transfer from the flywheel to the prime mover.

The invention may further provide a method of controlling a machine or vehicle comprising an ERS, the method selectively carrying out the steps of both of the above methods.

Thus during repeated cyclic operations, the ERS may make use of the fact that the mean power requirement is lower than the peak requirement. The prime mover may therefore be sized for such mean requirement without being over-sized to cater for the peak power requirement. During periods of low power requirement the prime mover may be used to store excess energy not required in the flywheel. Conversely, during periods in the cycle where high power is required, the previously stored flywheel energy in the ERS may be used to supplement the limited power capacity of the prime mover. Thus the prime mover may be downsized.

It should also be noted that the flywheel is especially suitable as a storage device for such cyclic operations, or for cycles which require short term energy storage. This is because the cycles tend to be of moderate energy but of high power. Further, flywheels tend to lose more energy than (for example) batteries due to their coast down losses. However, when used in cyclic operations, or stop-start urban vehicles such as buses, such limitations do not present a drawback, and the cost and high power capacity advantages of the flywheel system can be used to good effect.

The ERS may be used to recycle energy from the vehicle's wheels, tracks or other ground engaging arrangement. Typically, such energy recovery will involve the capture and reuse of vehicle kinetic energy, but it may equally be used to recover and reuse gravitational potential energy—for instance in mining trucks or other vehicles which climb and run down hills regularly.

In a further aspect of the invention there is provided a method of controlling a machine or vehicle comprising an ERS such as that described above, and a ground engaging arrangement (such as wheels or tracks), and a retarding (or braking) device, the method comprising the following steps:

a. Determining a signal indicative of a vehicle wheel torque request;

b. Varying the fluid displacement setting on one or both of the first and second pumping elements in order to effect power transfer from the flywheel to the ground engaging arrangement such that a portion of the vehicle wheel torque request is satisfied; and c. Setting the engine and/or retarding (or braking) device output (such as torque or power) such that substantially the remainder of the vehicle wheel torque request is satisfied by such engine output.

In a yet further aspect of the invention there is provided a method of controlling a machine or vehicle comprising an ERS such as that described above, and a ground engaging arrangement (such as wheels or tracks), the method comprising the following steps:

a. Determining a signal indicative of a vehicle wheel torque request;

b. Varying the fluid displacement setting on one or both of the first and second pumping elements in order to effect power transfer to the flywheel from the ground engaging arrangement such that a portion of the vehicle wheel torque request is satisfied; and c. Setting the engine output (such as torque or power) such that substantially the remainder of the vehicle wheel torque request is satisfied by such engine output.

In such a method, it may be advantageous to prioritise the use of the flywheel over use of the prime mover and/or over use of other vehicle or machine systems for supplying motive power or braking or retarding power. Thus energy may be transmitted to the flywheel from the ground engaging arrangement in preference to using a retarder or braking device on the vehicle or machine. Similarly, energy may be transmitted from the flywheel to the ground engaging arrangement in preference to using a prime mover on the vehicle or machine. Thus energy and/or fuel is saved, and the impact of coast-down energy in the flywheel are minimised because flywheel energy is stored and/or used at the earliest opportunity.

The invention is applicable to machines and/or vehicles.

The invention provides a vehicle or machine operated using one or more of the methods described above, and/or an ERS as described above.

The vehicle or machine may be an urban passenger vehicle, for example the vehicle is a bus or a coach.

The vehicle may be a construction, industrial or agricultural vehicle.

The vehicle or machine may be adapted and/or arranged for repeated cyclic working operations.

The vehicle or machine may be a loading or a material shifting vehicle or machine such as an excavator or wheeled loader.

The ERS can be advantageous as an energy saving device, and/or as a prime mover down-sizing enabler in the aforementioned vehicles and machines which may include repeated or cyclic operations, frequent stop-start characteristics in the case of an urban vehicle such as a bus or coach or even a city car, or the forwards travelling-reversing (shuttling) requirements of an off-highway vehicle or machine.

In the following description reference is made to an engine. it is to be understand this is a prime mover and may be an electric motor or other supply of motive power.

DESCRIPTION OF THE FIGURES

The present invention will now be described in more detail with reference to the attached drawings in which.

DETAILED DESCRIPTION

Figure 1:
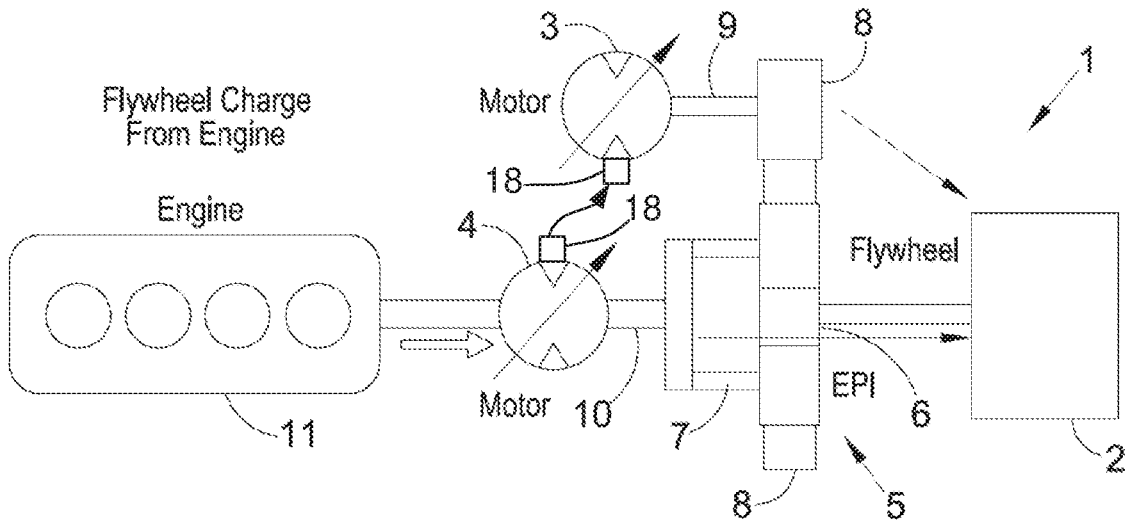
FIG. 1 shows an ERS coupled to an engine of a powertrain according to the invention, wherein the ERS is charging the flywheel when engine has surplus power.

With reference to FIGS. 1 to 6, an engine (or other prime mover) 11 is coupled to a first pumping element 4 which has an associated driveshaft 10 coupled to the carrier 7 of a simple epicyclic gearset 5. A second pumping element 3 which has an associated driveshaft 9 is coupled via a gear to an annulus 8 of epicyclic 5. A sun 6 is coupled to flywheel 2.

FIG. 1 shows the case where the first pumping element 4 is coupled to second pumping element 3, their respective fluid coupling arrangements arranged for transfer of fluid at pressure, and hence hydrostatic power, between them. By varying the displacement of one or both pumping elements using the fluid displacement mechanism 18, the CVT ratio can be adjusted in order to drive power into the flywheel. In this example, the torque applied to the carrier 7 will be opposite to that applied to the annulus 8. Hence in order to transfer power in a parallel fashion, as required by a power-split arrangement, the annulus should be driven in an opposite sense to the carrier 7.

This is readily accomplished with a hydrostatic CVT as the driveshaft 9 of the second pumping element 3 can be made to rotate in any desired direction with respect to the driveshaft 10 of the first pumping element 4 by configuring the fluid connections between the pumping elements appropriately, as is known. In this example, the pumping element 4 is configured to drive carrier 7, whilst the second pumping element 3 is configured to drive the annulus 8. This may be achieved by progressively decreasing the fluid displacement of the first pumping element 4 with respect to the first pumping element 3. This tends to increase the speed of the flywheel 2, thus transferring energy to it from the engine, or in the case of KERS, from the ground engaging member such as the wheels or tracks of a machine or vehicle. If the displacement of the first pumping element 4 reaches zero then substantially no power passes through the CVT and the power-split arrangement achieves its highest efficiency.

Figure 2:
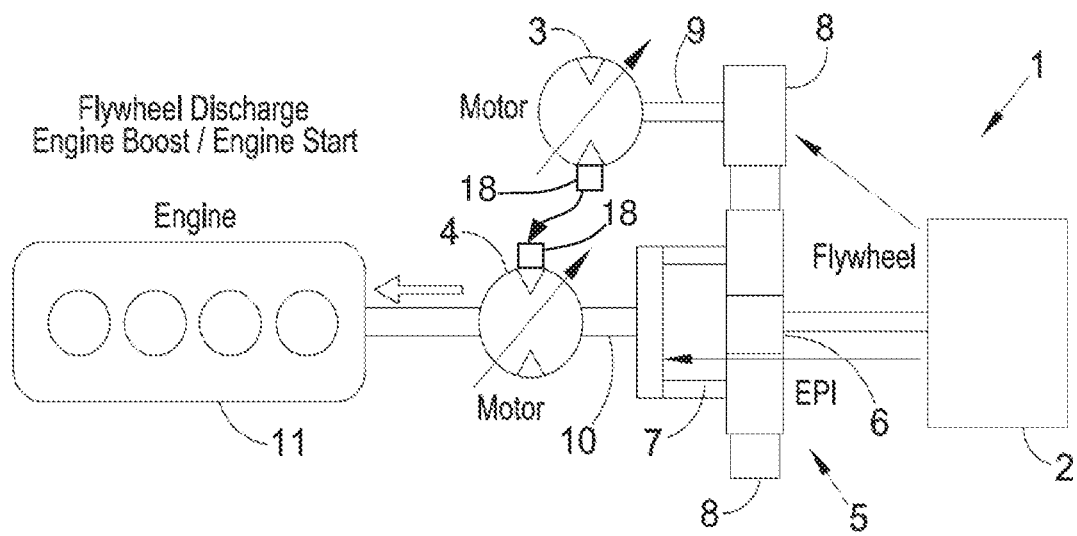
FIG. 2 shows an ERS coupled to an engine of a powertrain according to the invention, wherein the ERS is dis-charging the flywheel when engine has a deficit in power.

FIG. 2 shows the case where energy is transferred in the opposite sense—i.e. from the flywheel 2 back to the engine 11 side. This may be achieved in this example by increasing the fluid displacement of the first pumping element 4 with respect to the second pumping element 3, this slowing down the flywheel 2 and extracting energy from it.

Figure 3:
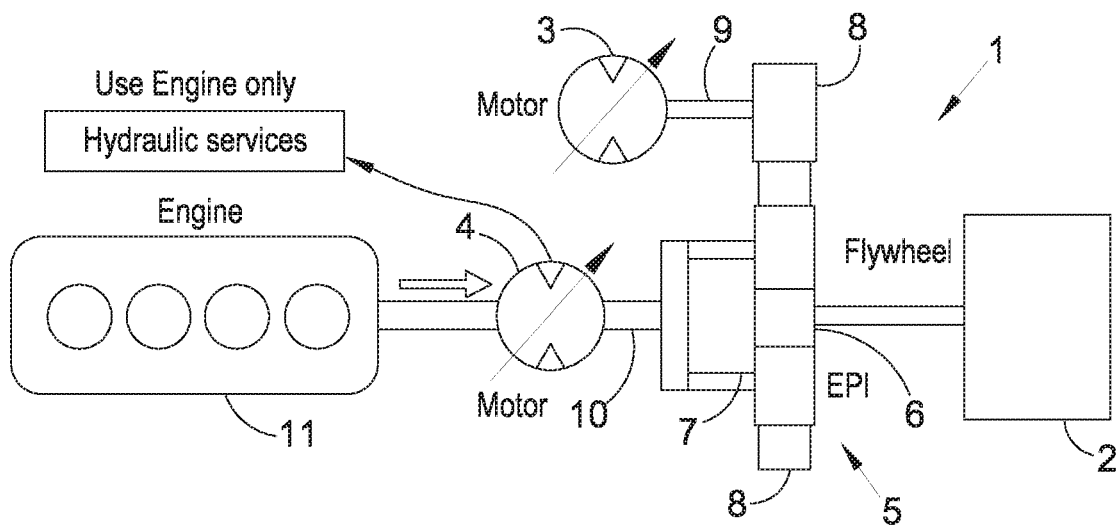
FIG. 3 shows an ERS coupled to an engine of a powertrain according to the invention, wherein the engine pump only is used to power hydraulic services.
Figure 4:
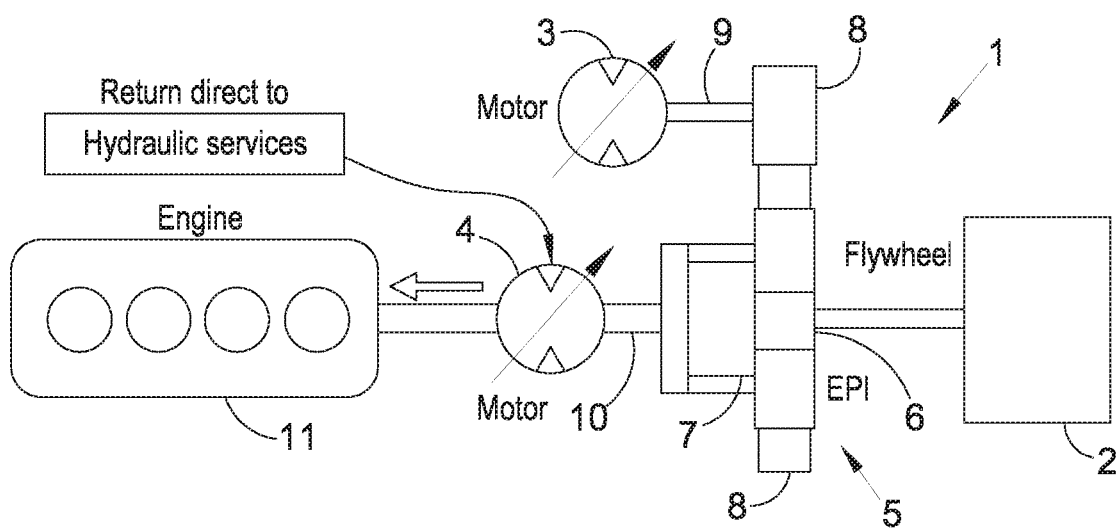
FIG. 4 shows an ERS coupled to an engine of a powertrain according to the invention, wherein the engine pump only is used to recuperate or receive power from hydraulic services.

FIGS. 3 and 4 show a case where the flywheel 2 may have insufficient state of charge to supply energy to the engine or to the vehicle or machine. In this case, the pumping elements 3 and 4 may be decoupled so that the engine 11 alone supplies power to hydraulic services (labelled), or so that energy from the hydraulic services may be used to support the prime mover 11.

Figure 5:
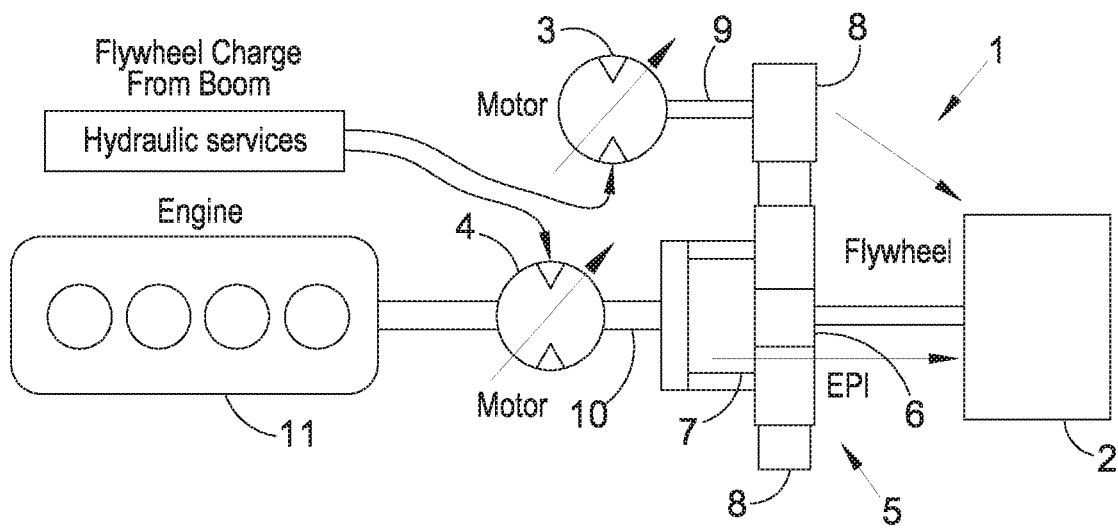
FIG. 5 shows an ERS coupled to an engine of a powertrain according to the invention wherein one or both of the first and second pumping elements are used to receive or recuperate energy from the hydraulic services, delivering such energy to the engine and/or flywheel.
Figure 6:
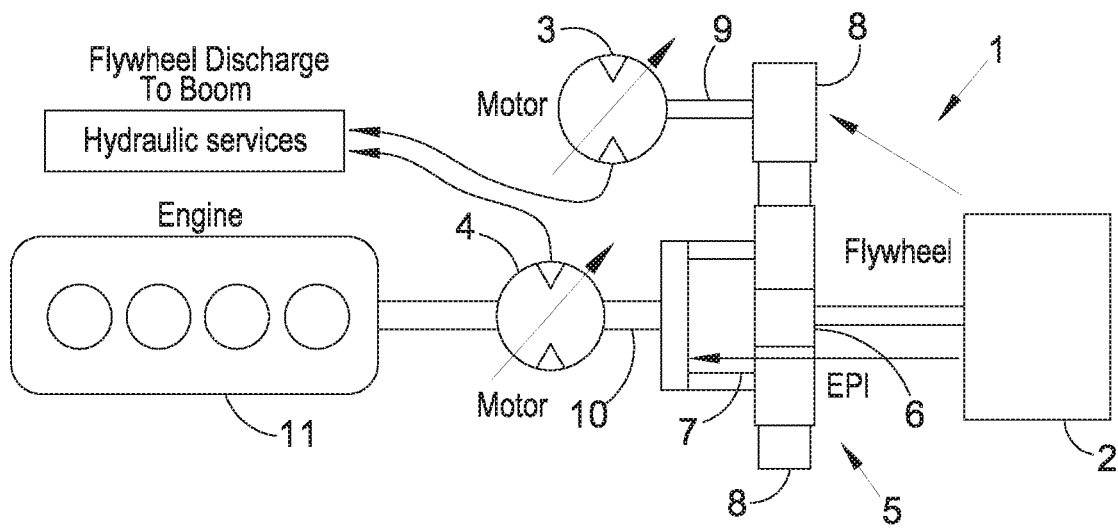
FIG. 6 shows an ERS coupled to an engine of a powertrain according to the invention wherein the hydraulic services are powered using one or both of the first and second pumping elements, and the engine and/or flywheel.

FIGS. 5 and 6 show the cases where power is received from (FIG. 5) or supplied to (FIG. 6) the hydraulic services. As the torques in the epicyclic 5 are related by gains related to the speed ratio between the sun and the annulus when the carrier is stationary, the sense of the speeds of the driveshaft 9 of second pumping element 3 may be set by suitably adjusting the fluid displacement mechanism for this pumping element such that power is taken in from the hydraulic service. Alternatively or additionally, a valve arrangement (not shown) intervening between the hydraulic services and the second (or first) pumping element may allow the speed and torques to be suitably reversed in order to achieve the correct sign of speed and torque at the epicyclic (in this case, annulus 8). In this configuration a portion of the power is passed through each pumping element 3, 4 towards, or away from, the flywheel 2.

Figure 7:
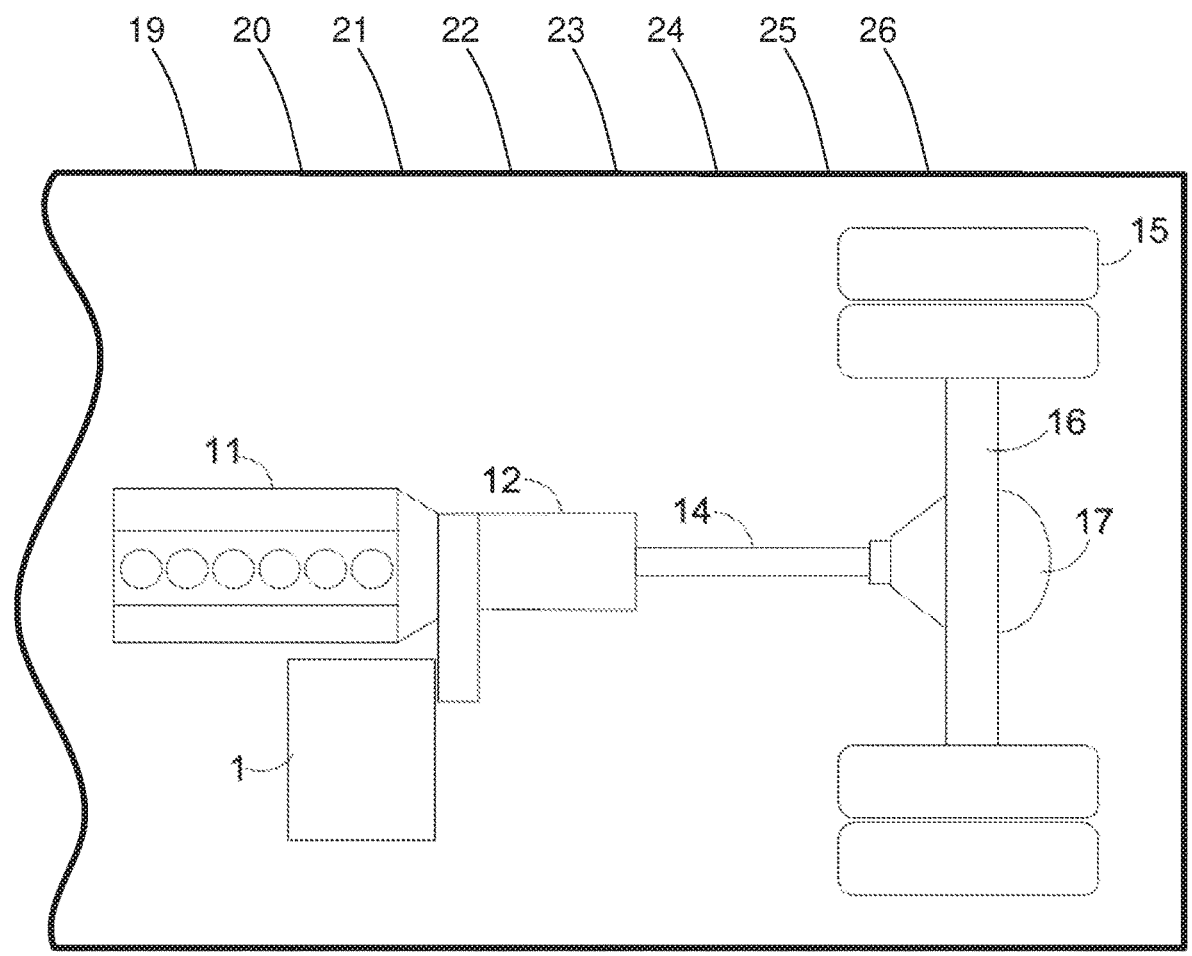
FIG. 7 shows an ERS coupled to an engine of a powertrain according to the invention wherein the ERS is adapted for the recovery of vehicle kinetic energy in a vehicle.

FIG. 7 shows an ERS in a vehicle (such as an urban passenger vehicle 19, a construction vehicle 20, an industrial vehicle 21, an agricultural vehicle 22, a loading vehicle 23, a material shifting vehicle 24, an excavator 25 or a wheeled loader 26). Engine 11 is coupled to ERS 1, which is optionally coupled to transmission 12. The output of transmission 12 is coupled to prop-shaft 14 which drives final drive 17. The final drive 17 is coupled to the vehicle wheels 15. Thus an ERS 1 mounted on or close to the engine 11 may also serve as a vehicle kinetic energy recovery system.

The invention claimed is:

1. An energy storage and recovery system (ERS) coupleable to a prime mover and to an energy storage flywheel, the ERS comprising:
    a hydrostatic arrangement having a first pumping element and a second pumping element, each pumping element having a respective fluid displacement and a fluid coupling arrangement for the transfer of fluid power between the first pumping element and the second pumping element, wherein at least one of the respective fluid coupling arrangements of the first and the second pumping elements may be selectively coupled to one or more hydraulic services for the transmission of fluid power between said at least one respective fluid coupling arrangement and the one or more hydraulic services; and
    a differential device comprising at least three inputs, wherein a first driveshaft of the first pumping element is coupled to a prime mover in use, a first input of the a differential device is coupled to said prime mover in use, a second input of the differential device is coupled to a second driveshaft of the second pumping element, and the third input of the differential device is coupled to a flywheel in use.

2. An ERS according to claim 1 in which the differential device is an epicyclic gearset.

3. An ERS according to claim 1, in which at least one of the pumping elements has a mechanism for varying its fluid displacement.

4. An ERS according to claim 3, wherein the first and second pumping elements have a mechanism for varying their respective fluid displacement.

5. An ERS according to claim 4, wherein both first and second pumping elements have a mechanism for varying and reversing flow for a given sense of speed of the respective driveshafts.

6. An ERS according to claim 1, wherein at least one of the pumping elements has a mechanism for varying and reversing flow for a given sense of speed of its driveshaft.

7. An ERS according to claim 1, wherein the first and the second pumping elements may be coupled via their respective fluid coupling arrangements for the transmission of fluid power between the two.

8. An ERS according to claim 7, further comprising a power-split arrangement in which only a portion of the power passing between the couple to said prime mover and the couple to said flywheel passes between the first and second pumping arrangements.

9. An ERS according to claim 1, wherein said first drive shaft is coupled to a carrier of an epicyclic, said second drive shaft is coupled to an annulus of said epicyclic and the flywheel is coupled to a sun of said epicyclic.

10. An ERS according to claim 9, wherein the epicyclic is a simple epicyclic.

11. An ERS according to claim 9, wherein there is a negative speed ratio between the sun and annulus with the carrier held stationary.

12. An ERS according to claim 1, wherein the respective fluid coupling arrangements of the first and the second pumping elements may be de-coupled so that transmission of fluid power between the two is not possible.

13. An ERS according to claim 1, adapted for transfer of vehicle kinetic energy to or from said flywheel.

14. An ERS according to claim 1, further comprising an energy storage flywheel coupled to the third input of the differential device.

15. An ERS according to claim 1, further comprising a prime mover coupled to said first driveshaft of the first pumping element and to a first input of the differential device.

16. A method of controlling a machine or vehicle comprising an ERS according to claim 1, the method comprising the following steps:
   a. determining a signal indicative of a power demanded by the current operating conditions of the machine or vehicle duty cycle;
   b. setting the prime mover power output to exceed that demanded by the current operating conditions of the vehicle or machine duty cycle; and
   c. varying the fluid displacement setting on one or both of the first and second pumping elements in order to effect power transfer from the prime mover to the flywheel.

17. A vehicle or machine operating according to claim 16.

18. A vehicle or machine according to claim 17 wherein the vehicle or machine is an urban passenger vehicle.

19. A vehicle or machine according to claim 17 wherein the vehicle or machine is one of a construction, industrial or agricultural vehicle.

20. A vehicle or machine according to claim 17 wherein the vehicle or machine is adapted for repeated cyclic operations.

21. A vehicle or machine according to claim 17 wherein the vehicle is one of a loading vehicle, a material shifting vehicle, an excavator and a wheeled loader.

22. A method of controlling a machine or vehicle comprising an ERS according to claim 1, the method comprising the following steps:
   a. determining a signal indicative of a power demanded by the current operating conditions of the machine or vehicle duty cycle;
   b. setting the prime mover power output to a level which is lower than that demanded by the current operating conditions of the vehicle or machine duty cycle; and
   c. varying the fluid displacement setting on one or both of the first and second pumping elements in order to effect power transfer from the flywheel to the prime mover.

23. A method of controlling a machine or vehicle comprising an ERS according to claim 1, the method comprising the following steps:
   a. determining a signal indicative of a power demanded by the current operating conditions of the machine or vehicle duty cycle;
   b. determining the direction to transfer power between the flywheel and the prime mover;
   b. setting the prime mover power output to a level which is lower or higher than that demanded by the current operating conditions of the vehicle or machine duty cycle dependent on the determined direction to power transfer; and
   d. varying the fluid displacement setting on one or both of the first and second pumping elements in order to effect power transfer from or to the flywheel to the prime mover dependent on the determined direction to power transfer.

24. A method of controlling a machine or vehicle comprising a ground engaging drive arrangement and an ERS according to claim 1, the method comprising the following steps:
   a. determining a signal indicative of a ground engaging drive arrangement torque request;
   b. varying the fluid displacement setting on one or both of the first and second pumping elements in order to effect power transfer from the flywheel to the ground engaging drive arrangement such that a portion of the torque request is satisfied; and
   c. setting the engine output such that substantially the remainder of the torque request is satisfied by said engine output.

25. A method of controlling a machine or vehicle comprising a ground engaging drive arrangement and an ERS according to claim 1, the method comprising the following steps:
   a. determining a signal indicative of a vehicle wheel torque request;
   b. setting the engine output such that the ground engaging drive arrangement torque request is exceeded by said engine output; and
   c. varying the fluid displacement setting on one or both of the first and second pumping elements in order to effect power transfer to the flywheel from the ground engaging drive arrangement such that substantially the remainder of the engine output is provided to said flywheel.

26. A method of controlling a machine or vehicle comprising a ground engaging drive arrangement and an ERS according to claim 1, the method comprising the following steps:
   a. determining a signal indicative of a ground engaging drive arrangement torque request;
   b. determining the direction to transfer power between the flywheel and ground the engaging drive arrangement;
   c. setting the engine output such that the output exceeds the torque request or vice versa dependent upon said determined direction; and
   d. varying the fluid displacement setting on one or both of the first and second pumping elements according to the determined direction, in order to control whether excess engine output is provided to the flywheel or torque from the flywheel is provided to said ground engaging drive arrangement where the engine output does not satisfy the torque request.

27. A vehicle or machine operating including an ERS according to claim 1.

* * * * *